United States Patent [19]

Borgstrom

[11] 4,101,762
[45] Jul. 18, 1978

[54] RECORDING DISTANCE MEASURING INSTRUMENT AT VEHICLE WHEEL HUB

[75] Inventor: Carl Gote Lennart Borgstrom, Svangsta, Sweden

[73] Assignee: AB Record Taxameter AB, Halmstad, Sweden

[21] Appl. No.: 695,394

[22] Filed: Jun. 14, 1976

Related U.S. Application Data

[63] Continuation-in-part of Ser. No. 549,702, Feb. 13, 1975, abandoned, and a continuation-in-part of Ser. No. 612,208, Sep. 10, 1975, Pat. No. 4,083,489.

[30] Foreign Application Priority Data

| Feb. 27, 1974 | [SE] | Sweden | 7402578 |
| Feb. 21, 1975 | [AU] | Australia | 78449/75 |
| Feb. 26, 1975 | [CA] | Canada | 220850 |
| Feb. 26, 1975 | [DK] | Denmark | 766/75 |
| Feb. 27, 1975 | [GB] | United Kingdom | 8197/75 |
| Feb. 24, 1975 | [FI] | Finland | 750511 |

[51] Int. Cl.$^2$ ............................................. G01C 27/00
[52] U.S. Cl. ................................ 235/95 C; 235/95 B; 235/95 R
[58] Field of Search .................. 235/95 R, 95 B, 95 C

[56] References Cited

U.S. PATENT DOCUMENTS

| 1,756,443 | 4/1930 | Veeder | 235/95 B |
| 3,130,907 | 4/1964 | Coffey | 235/95 C |
| 3,198,430 | 8/1965 | Hermann | 235/95 C |
| 3,779,456 | 12/1973 | Burnett | 235/95 C |

*Primary Examiner*—Ulysses Weldon
*Attorney, Agent, or Firm*—Sherman & Shalloway

[57] ABSTRACT

A hub meter for recording distance covered includes a housing and counter both of which rotate, along with a hub of a wheeled vehicle. A shaft is held generally stationary, with respect to the hub by an annular pendulum, fixed to the shaft and containing a plurality of lead balls.

4 Claims, 5 Drawing Figures

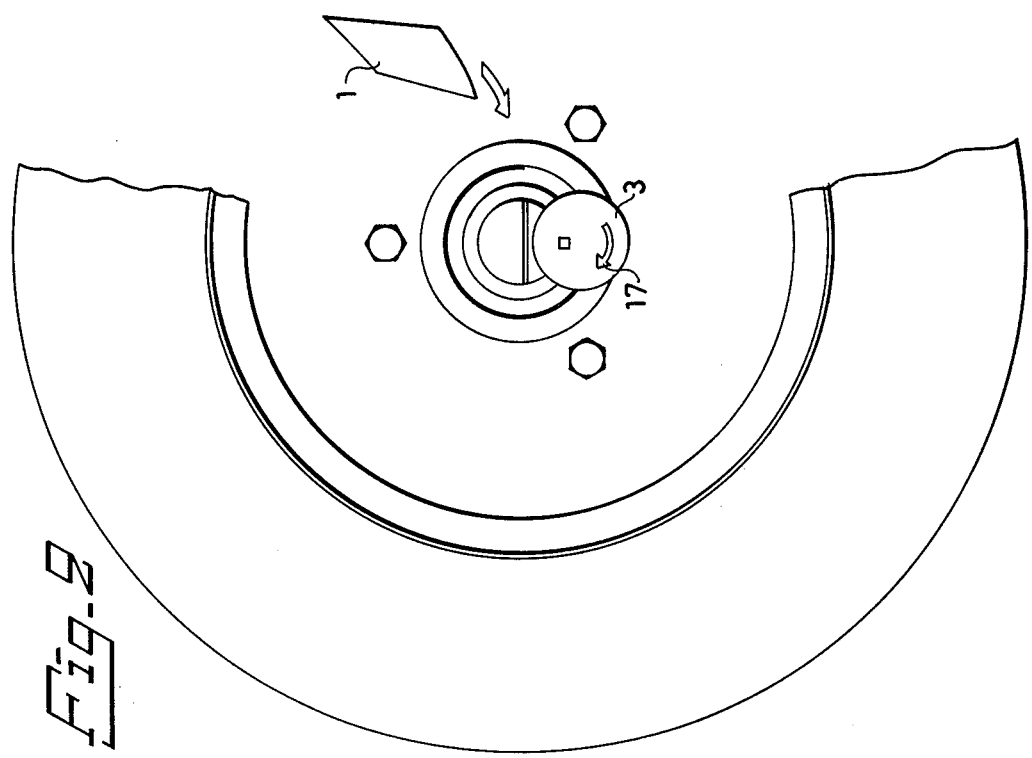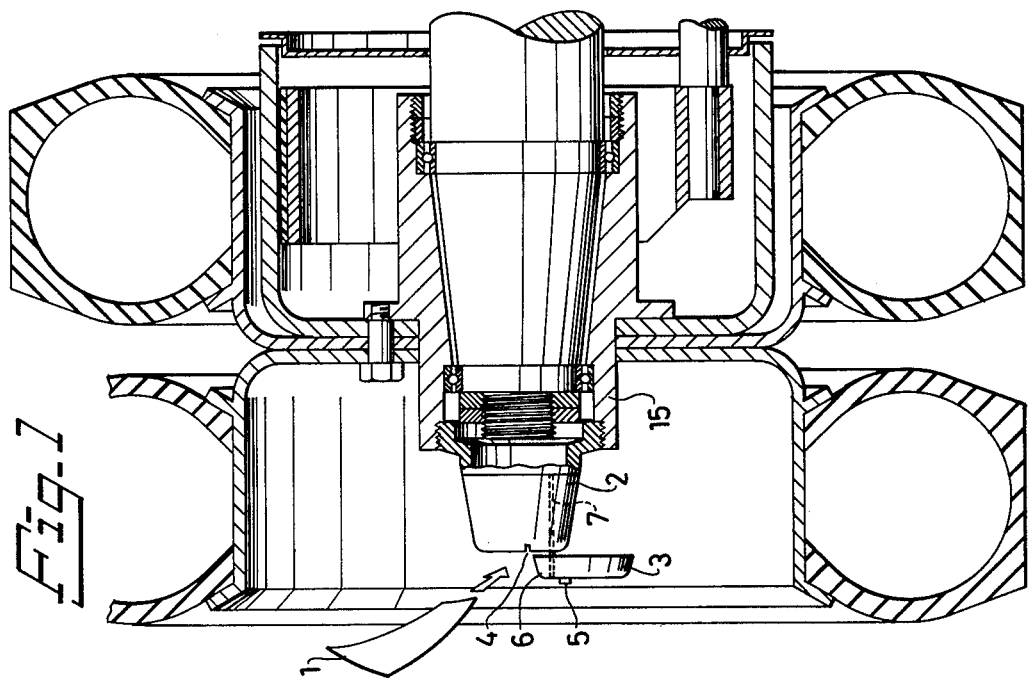

RECORDING DISTANCE MEASURING INSTRUMENT AT VEHICLE WHEEL HUB

This application is a Continuation-in-part application of copending applications Ser. No. 549,702 filed Feb. 13, 1975, now abandoned, and Ser. No. 612,208 filed Sep. 10, 1975 now Pat. No. 4,083,489.

BACKGROUND OF THE INVENTION

1. Field of the Invention

This invention relates to a device attached to a vehicle wheel hub for recording the distance covered by the vehicle and comprising a counting mechanism, a printing mechanism for stamp cards and feed means for feeding the counting mechanism wheels as a function of said distance.

2. Technical Consideration

The distance measuring instrument in question can be coupled and attached to wheel hubs of both traction vehicles and trailers coupled to such vehicles. In view of the fact that the distance measuring instrument is intended to be attached to a wheel hub, it may be called "hub meter". Its counting mechanism may be of any conventional design comprising number wheels provided with types or printing dyes. The hub meter further comprises a mechanism with stationary number types corresponding to the apparatus number of meter. The stamping mechanism may be of known design and is intended to release the printing of the values of the number types in question on the number wheels in the counting mechanism, i.e., the distance in kilometers covered by the vehicle, onto a stamp card, which for this purpose is introduced into the hub meter. At the same time said apparatus number is printed. The stamp card, which is provided with carbon paper, is introduced for printing through a card slot in the meter, which slot becomes accessible when a covering or protective lid on the free end of the meter is pivoted or folded aside. Said lid, in addition to sealing the meter to prevent dirt from entering thereinto, also acts as a handle for releasing the printing mechanism. When the lid is to be folded aside, a screw in the lid is actuated to release the lid from the apparatus casing, whereafter the lid is actuated for exposing the slot to introduce the stamp card therethrough. The lid is then, for printing, actuated in a definite way, in order to release the printing mechanism to print on the stamp card introduced into the card slot. The movement of the lid in this conjunction may be a rotary or a folding movement.

The hub meter, further, may comprise a curtain or slide, which normally shuts the card slot, but is opened when the meter is being operated for card printing, and thereafter is shut to prevent improper objects, which may block the counting mechanism, from being introduced into the meter through the card slot. Such curtains have been proposed previously for meters of other types.

The hub meter may, in addition, include a base plate, which is intended for mounting and supporting the meter and faces towards the wheel hub, to which it is attached. Said base plate is heat insulated from the remaining details of the meter, so that heat produced by the vehicle wheel cannot be transferred by conduction to the interior of the meter.

The number wheels of the counting mechanism may be arranged to be advanced by jumps, irrespective of the rotational direction of the vehicle wheel.

It is understood, that a hub meter rotates together with the vehicle wheel to which the meter is attached, when the vehicle is driven. The counting mechanism, rigidly mounted in the meter housing, then also rotates together with said wheel. For rendering it possible for the counting mechanism wheels to be advanced in synchronism with the movement of the vehicle wheel and meter, a feed mechanism actuated by the rotation of the meter must be introduced. For this purpose, a non-rotary reference means must be introduced into the meter as a fixed "reference point". According to the invention, a pendulum mechanism is utilized, which by action of gravitation maintains a substantially constant position, independently of the rotation of the meter and counting mechanism, and which actuates the feed mechanism for the number wheels of the counting mechanism. Said pendulum mechanism comprises a pendulum with a swing axle, which is concentric with the vehicle axle, and includes means for coupling said axle to the feed mechanism.

Under such operational conditions, as acceleration and retardation of a vehicle, when the vehicle drives down into holes in the road etc., a pendulum tends to turn rounds one or more revolutions, and at its worst has the tendency of participating in the rotary movement of the hub meter, which is attached to and caused to rotate by said wheel, so that the feed mechanism of the counting mechanism remains unaffected and, consequently, recording of the covered distance does not take place. The pendulum, according to the invention, is so designed that such inconveniences due to incorrect recording of covered distances are avoided. The pendulum, more precisely, has been given the shape of a thin-walled, hollow ring with smooth inner surface. The annular space in the ring is filled to some part with movable spherical balls of a heavy material, for example lead. The balls can move freely relative to each other and to the inner walls of the ring. The resulting friction effect implies an effect consumption, which efficiently brakes the ring under such conditions, which otherwise would have caused a pendulum with lumped mass to participate in the rotation of the meter. The pendulum, furthermore, is provided with a fixed balance weight, in order to prevent the annular pendulum from slowly migrating around, when it is subjected to vibration forces. Owing to the gravity force, the unbalance thus obtained in the pendulum system with ring and balls will cause the pendulum to assume a substantially constant static position.

SUMMARY OF THE INVENTION

The instant invention contemplates a device, which is attached to the hub of a vehicle axle to record the distance traveled by the vehicle on cards inserted into the device. In order to provide a reference for the mechanism, an annular pendulum concentric with the vehicle axis is provided, which indexes a counting mechanism through a coupling means.

BRIEF DESCRIPTION OF THE DRAWINGS

The invention is described in detail by the following text, with reference to a preferred embodiment, shown by way of an example in the accompanying drawings, in which:

FIG. 1 is a view, partially in section, of a vehicle wheel provided with the distance measuring instrument, according to the invention;

FIG. 2 is a partial sectional view, which shows a portion of said wheel seen from the side;

DETAILED DESCRIPTION

Figure 3:
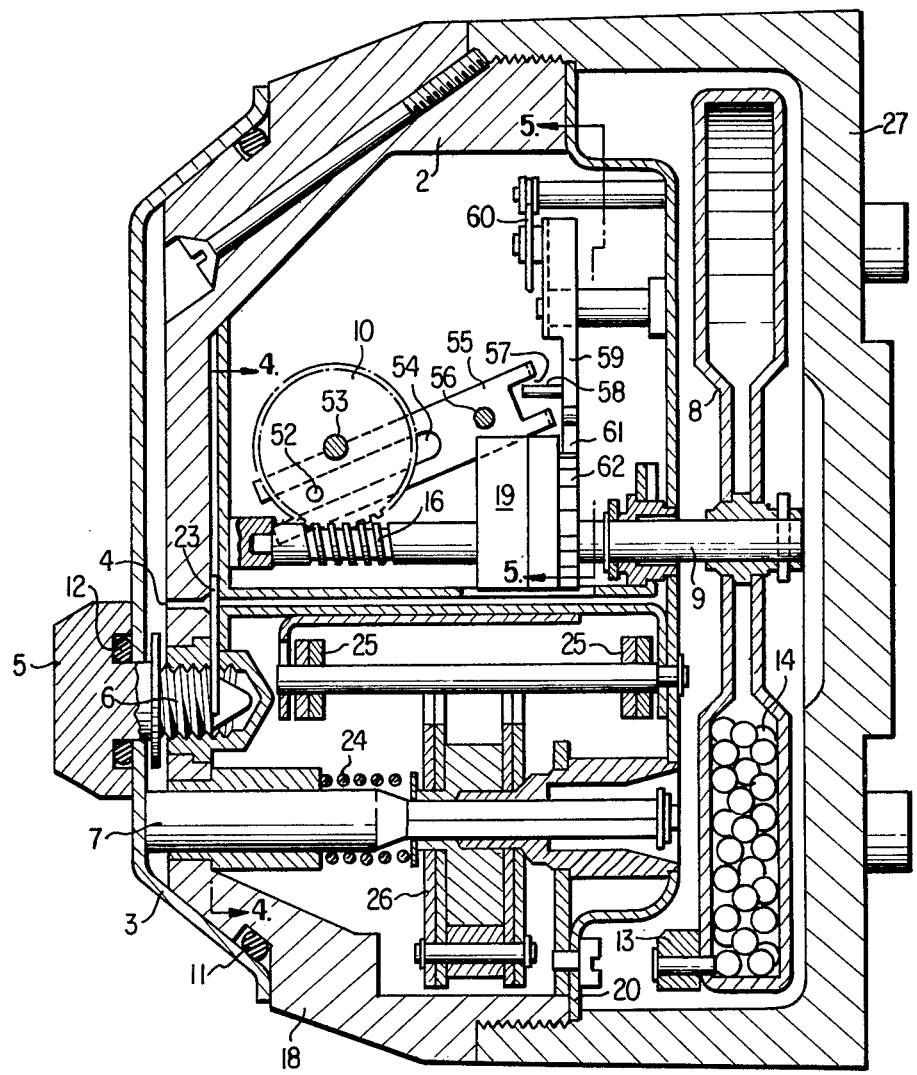
FIG. 3 is a cross-section through the distance measuring instrument, according to the invention, of which the main parts are visible.

In FIGS. 1 and 2, a so-called hub meter 2 is shown mounted on a vehicle hub 15 to rotate together with the vehicle wheel. The hub meter, as will be apparent in greater detail from the following, comprises a kilometer counting mechanism, which is mounted in the meter housing, so that it rotates together with the meter. Within the meter housing, a card printing mechanism is mounted to print on a stamp card 1 the kilometer value in question indicated in the counting mechanism. The meter is provided with a protective lid 3, which is pivotal about an axle 7 and normally covers the free end of the meter, but after loosening a lid screw 5 from its thread 6 in the hub meter, the housing can be swung down to the position shown in FIGS. 1 and 2, in which position a card insertion slot 4 is exposed for inserting the stamp card 1. In order to release the printing mechanism, the lid 3 is rotated, as indicated by the arrow 17 in FIG. 2.

The meter housing, as appears from FIG. 3, comprises a meter hood 18 and a meter base plate 27. Between a cup-shaped bottom 20 and the base plate 27, a pendulum 8 is located, and between the bottom 20 and hood 18, the counting mechanism and printing mechanism are arranged.

The counting mechanism is illustrated by one counting mechanism wheel 19, and the printing mechanism by a hammer 25, lifting arm 26 and the lid axle 7, which releases the printing mechanism. The printing mechanism operates in the manner disclosed in copending U.S. patent application, Ser. No. 612,208, filed Sept. 10, 1975 and incorporated herein by reference. The protective lid 3 is held in a position above the free (lefthand) end of the lid screw 5, which is screwed into a thread 6 in the meter hood 18. The screw 5 is provided with a sealing gasket 12, and the lid 3 has a sealing ring 11. As mentioned above, the lid 3 can be swung about its axle 7, when the screw 5 has been loosened. Consequently, the card slot 4 is exposed.

Figure 4:
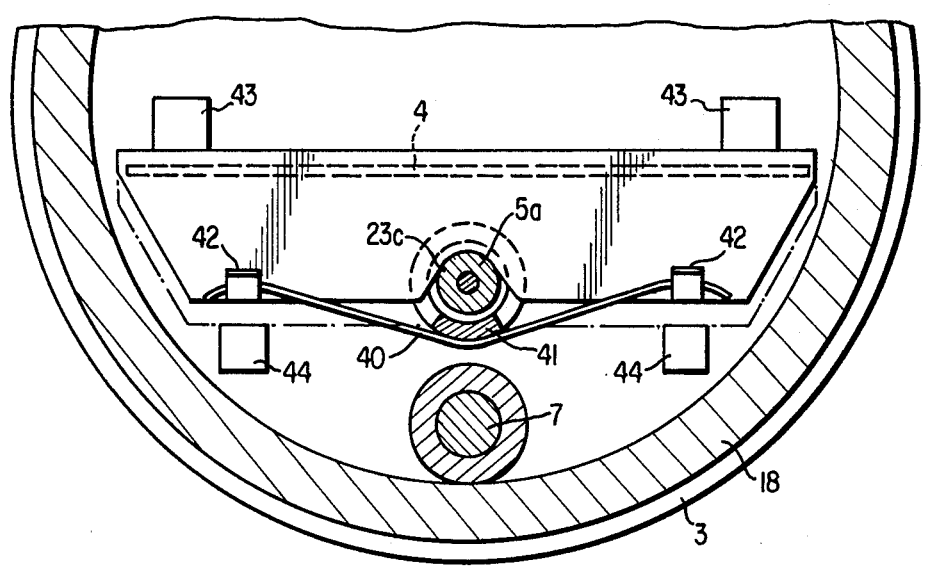
FIG. 4 is a front elevation in section taken along lines 4—4 of FIG. 3, showing operation of a curtain plate, which selectively closes a slot, which receives a printing card.
Figure 5:
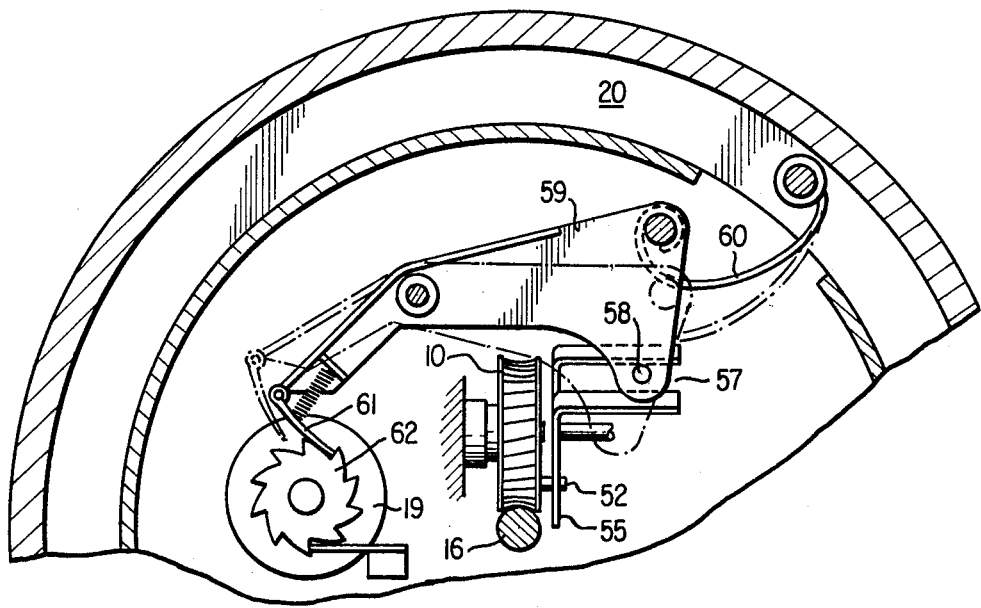
FIG. 5 is a front sectional view taken along lines 5—5 of FIG. 3.

As is seen in FIGS. 3 and 4, the screw 5 has a conical end 5a, which engages a rounded recess 23c in the curtain 23. When the screw is backed out, the curtain 23 slides down in FIG. 4, because the spring 40 urges the curtain against the conical end 5a. The spring 40 is retained against a lug 41, which is fixed to the housing and by lugs 42 on the curtain 23. As the curtain 23 slides to the left, it exposes slot 4, into which the stamp card 1 can be inserted. Shoulders 43 position and limit movement of the curtain 23, when the curtain covers the slot 4, while shoulders 44 position the curtain when the slot is open.

The annular pendulum 8 is a hollow ring, which is partially filled with metal balls 14 and is provided with a stationary weight 13. The pendulum is attached to the projecting free (right-hand) end of a swing axle 9, which is freely supported for rotation in a bearing 21 in the bottom 20 and a bearing 22 at its other (left-hand) end. The left-hand end of the axle 9 is provided with a screw 16 for engagement with a worm gear wheel 10. Said worm wheel 10 co-acts with a feed mechanism for the number type wheels of the counting mechanism. As appears from the construction shown and from the information in the above introductory portion, the pendulum 9 maintains substantially its position, shown in FIG. 3, with the weight 13 farthest down during the rotary movement of the vehicle wheel and the meter in general. The relative motion between the counting mechanism and swing axle serves, by help of the worm gear 10, 16, to advance the type wheels of the counting mechanism to an extent proportional to the distance covered by the vehicle wheel, so that the number wheels of the counting mechanism at any moment indicate the corresponding number of kilometers, which by printing in the manner described can be transferred to a stamp card introduced into the meter.

The counter 19 may be operated by a system similar to that disclosed in copending U.S. patent application, Ser. No. 612,208, filed Sept. 10, 1975, incorporated herein by reference. In utilizing such a system, the worm gear wheel 10 has a bushing 52 secured thereto, which revolves around the axis 53 of the wheel 10, as the wheel rotates. The bushing 52 is received in a slot 54 in one end of a lever 55, which is pivoted about an axis 56. Consequently, as the wheel 10 rotates, the lever 55 oscillates back and forth. The lever 55 has a slot 57 in the opposite end thereof, which receives a lug 58 secured to a feed hook 59. As the lever oscillates, it causes the feed hook 59 to snap from one position to another, as a spring 60 is carried overcenter, in the manner disclosed in copending U.S. application, Ser. No. 612,208.

A feed spring 61 attached to the feed hook 59 engages a ratchet wheel 62, which drives the counter 19 by indexing a first wheel in the counter with each cycle of the feed hook. The counter functions in a conventional fashion, wherein as each wheel makes one revolution, it indexes the next successive wheel one step.

What is claimed is:

1. In a device attached to a vehicle hub for recording distances covered by the vehicle, wherein the device includes a counting mechanism having wheels that advance as the hub rotates, the improvement comprising:

a housing secured in fixed relation to said hub for containing said device and supporting said counting mechanism for rotation with said hub;

a shaft rotatably mounted in said housing for free rotation relative to each of said housing, said hub and said counting mechanism;

means for coupling said shaft to said counting mechanism to rotate the wheels of said counting mechanism, upon relative rotation between said shaft and said counting mechanism;

annular pendulum means non-rotatably secured to said shaft and tending to hold said shaft stationary with respect to said mechanism, said housing and said hub as said hub rotates;

an annular chamber within said pendulum means for holding a plurality of loose metal balls having a radial depth substantially less than the radial depth of said annular pendulum means, said loose metal balls moveable relative to said pendulum to change the center of gravity thereof, upon applying a vertical impact to the hub, so that the pendulum rotates; and means fixed to said pendulum for returning said pendulum to essentially the same position, with respect to said hub, after the vertical impact has occurred, and to prevent the pendulum from slowly migrating, when subjected to vibration forces.

2. The device of claim 1, wherein the balls are made of lead.

3. The device of claim 1, wherein the means for returning said pendulum is a weight attached thereto.

4. The device of claim 1, further including a slot for the insertion of an image-receiving card and a cover disposed over said slot.

* * * * *